(12) United States Patent
Carbone et al.

(10) Patent No.: US 11,718,268 B2
(45) Date of Patent: Aug. 8, 2023

(54) MONITORING SYSTEM FOR BUSES

(71) Applicant: LAZZERINI SOCIETA' A RESPONSABILITA' LIMITATA, Monsano (IT)

(72) Inventors: Innocenzo Salvatore Carbone, Santa Maria Nuova (IT); Maria Abbate, Jesi (IT)

(*) Notice: Subject to any disclaimer, the term of this patent is extended or adjusted under 35 U.S.C. 154(b) by 0 days.

(21) Appl. No.: 17/615,650

(22) PCT Filed: Jun. 3, 2020

(86) PCT No.: PCT/EP2020/065354
§ 371 (c)(1),
(2) Date: Dec. 1, 2021

(87) PCT Pub. No.: WO2020/245201
PCT Pub. Date: Dec. 10, 2020

(65) Prior Publication Data
US 2022/0305966 A1    Sep. 29, 2022

(30) Foreign Application Priority Data
Jun. 4, 2019 (IT) .................. 102019000008046

(51) Int. Cl.
*B60R 22/48* (2006.01)
*B60N 2/00* (2006.01)
*B60N 2/24* (2006.01)

(52) U.S. Cl.
CPC .............. *B60R 22/48* (2013.01); *B60N 2/002* (2013.01); *B60N 2/242* (2013.01); *B60R 2022/4808* (2013.01); *B60R 2022/4866* (2013.01)

(58) Field of Classification Search
CPC ... B60R 21/00; B60R 21/0132; B60R 21/015; B60R 21/01546; B60R 22/26; B60R 22/44; B60R 22/48; B60R 25/10; B60R 25/102; B60R 25/1018; B60R 25/31; B60R 25/34; B60N 2/28; B60N 2/2851; B60N 2/688; B60N 2/00; B60N 2/242; G08B 21/22
See application file for complete search history.

(56) References Cited

U.S. PATENT DOCUMENTS

| 7,812,716 | B1 | 10/2010 | Cotter | |
|---|---|---|---|---|
| 2005/0080533 | A1 | 4/2005 | Basir | |
| 2009/0132128 | A1 | 5/2009 | Marriott et al. | |
| 2013/0035827 | A1* | 2/2013 | Breed | B60W 40/06 701/45 |
| 2016/0119034 | A1* | 4/2016 | Kuroda | H04B 5/0075 375/257 |

(Continued)

OTHER PUBLICATIONS

NPL Search (Jan. 27, 2023).*

(Continued)

*Primary Examiner* — Van T Trieu
(74) *Attorney, Agent, or Firm* — Egbert, McDaniel & Swartz, PLLC

(57) ABSTRACT

A monitoring system for buses includes presence sensors and belt sensors connected to slaves connected to a connection cable to transport the signals from the slaves in such a way to form a field bus. The connection cable is connected to a master that receives the signals from the slaves. The master is connected to a human-machine interface (HMI) by a network cable.

5 Claims, 7 Drawing Sheets

(56) References Cited

U.S. PATENT DOCUMENTS

2018/0164076 A1* 6/2018 Steenson, Jr. ........... F41G 7/001
2020/0290567 A1* 9/2020 Funyak ................... B60R 25/34
2021/0253061 A1* 8/2021 Bruns ..................... B60R 22/48

OTHER PUBLICATIONS

International Search Report for corresponding PCT/EP2020/065354, dated Jul. 23, 2020.
Written Opinion of the International Searching Authority for corresponding PCT/EP2020/065354, dated Jul. 23, 2020.

* cited by examiner

MONITORING SYSTEM FOR BUSES

CROSS-REFERENCE TO RELATED APPLICATIONS

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention refers to a monitoring system for buses that is suitable for monitoring the fastening of the seat belts in a bus and calculating the number of free passenger seats.

2. Description of Related Art Including Information Disclosed Under 37 CFR 1.97 and 37 CFR 1.98

As it is known, each passenger seat must be provided with a seat belt. Nevertheless, the seat belts are generally not fastened by passengers.

Further to serious accidents, which resulted in the death of passengers who had not fastened their seat belt, the bus market has focused its attention on the need to monitor the fastening of the seat belts.

Some countries have introduced laws that require the bus driver to make sure that the passengers have fastened their seat belts. In view of the above, it is necessary to provide and install a system for monitoring the fastening of the seat belts that can be easily managed and controlled by the driver.

US2009/132128 discloses a bus comprising a system for monitoring the fastening of the seat belts. Such a monitoring system comprises presence sensors disposed in the passenger seats to detect the presence of a passenger on each seat, as well as belt sensors disposed in each lock of the seat belts to detect the fastening of each seat belt of each passenger seat.

The presence sensors and the belt sensors are connected by means of cables to a control unit connected to a display. In view of the above, the driver can display on the screen the free seats and the occupied seats, as well as the fastened belts and the unfastened belts.

Evidently, the connection of such a monitoring system is extremely complicated and cumbersome. For example, a bus with 100 seats will require 100 cables to connect the presence sensors to the control unit and additional 100 cables to connect the belt sensors to the control unit. Moreover, such a type of monitoring system is not versatile, autonomous, integrated or customized. Such a system cannot be industrialized or installed in the automotive sector because it is too complex, too cumbersome and difficult to manage for the bus manufacturers.

BRIEF SUMMARY OF THE INVENTION

The purpose of the present invention is to eliminate the drawbacks of the prior art by devising a monitoring system for buses provided with simplified connections and easy to install.

Another purpose of the present invention is to disclose such a monitoring system for buses that is versatile, autonomous, integrated and customized.

These purposes are achieved according to the invention with the characteristics of the independent claim 1.

Advantageous embodiments of the invention appear from the dependent claims.

The monitoring system of the invention is defined in claim 1.

BRIEF DESCRIPTION OF THE SEVERAL VIEWS OF THE DRAWINGS

Additional features of the invention will appear manifest from the following description, which refers to a merely illustrative, not limiting embodiment, as illustrated in the attached figures, wherein.

DETAILED DESCRIPTION OF THE INVENTION

Figure 1:
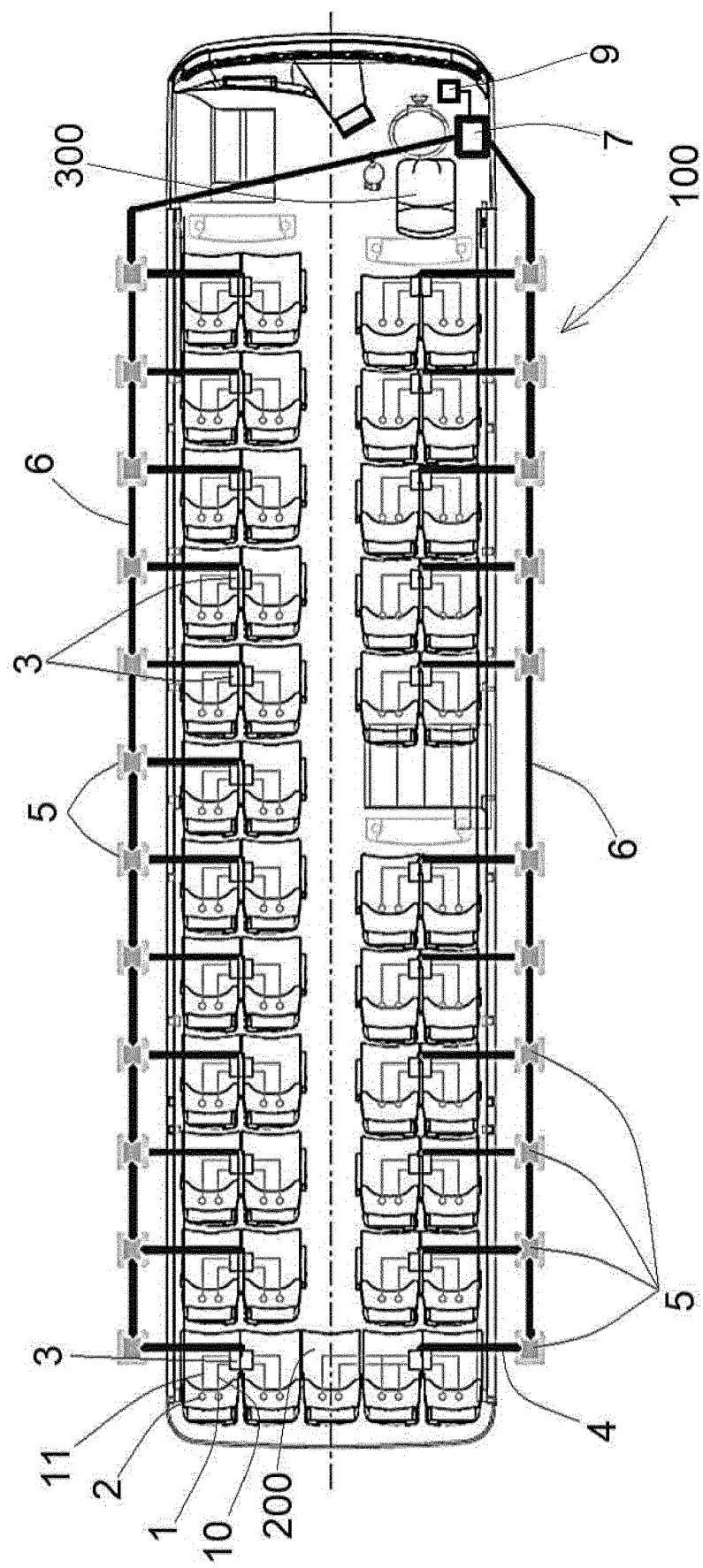
FIG. 1 is a diagrammatic plan view of a bus provided with the monitoring system of to the invention.

With reference to the Figures, the monitoring system according to the invention is described, which is globally indicated with reference numeral (100).

FIG. 1 shows a bus provided with the monitoring system (100). The bus comprises a plurality of passenger seats (200).

Figure 1A:
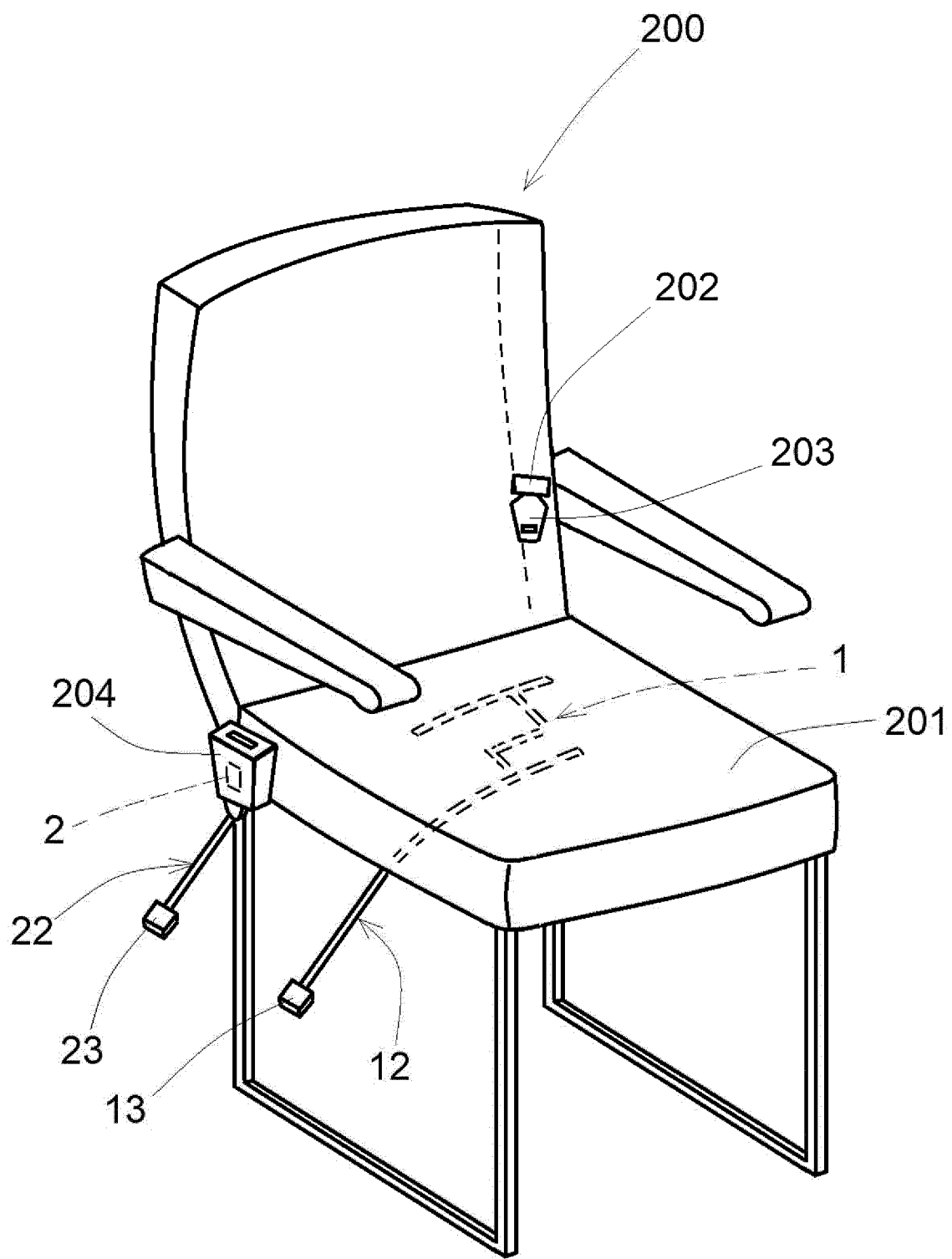
FIG. 1A is a diagrammatic perspective view of a seat of the bus of FIG. 1.

With reference to FIG. 1A, each passenger seat (200) comprises a seat (201) that generally comprises a foam padding. The passenger seat (200) also comprises a seat belt (202) connected to a buckle (203) suitable for being engaged in a lock (204) that is generally fixed to the passenger seat.

Figure 2:
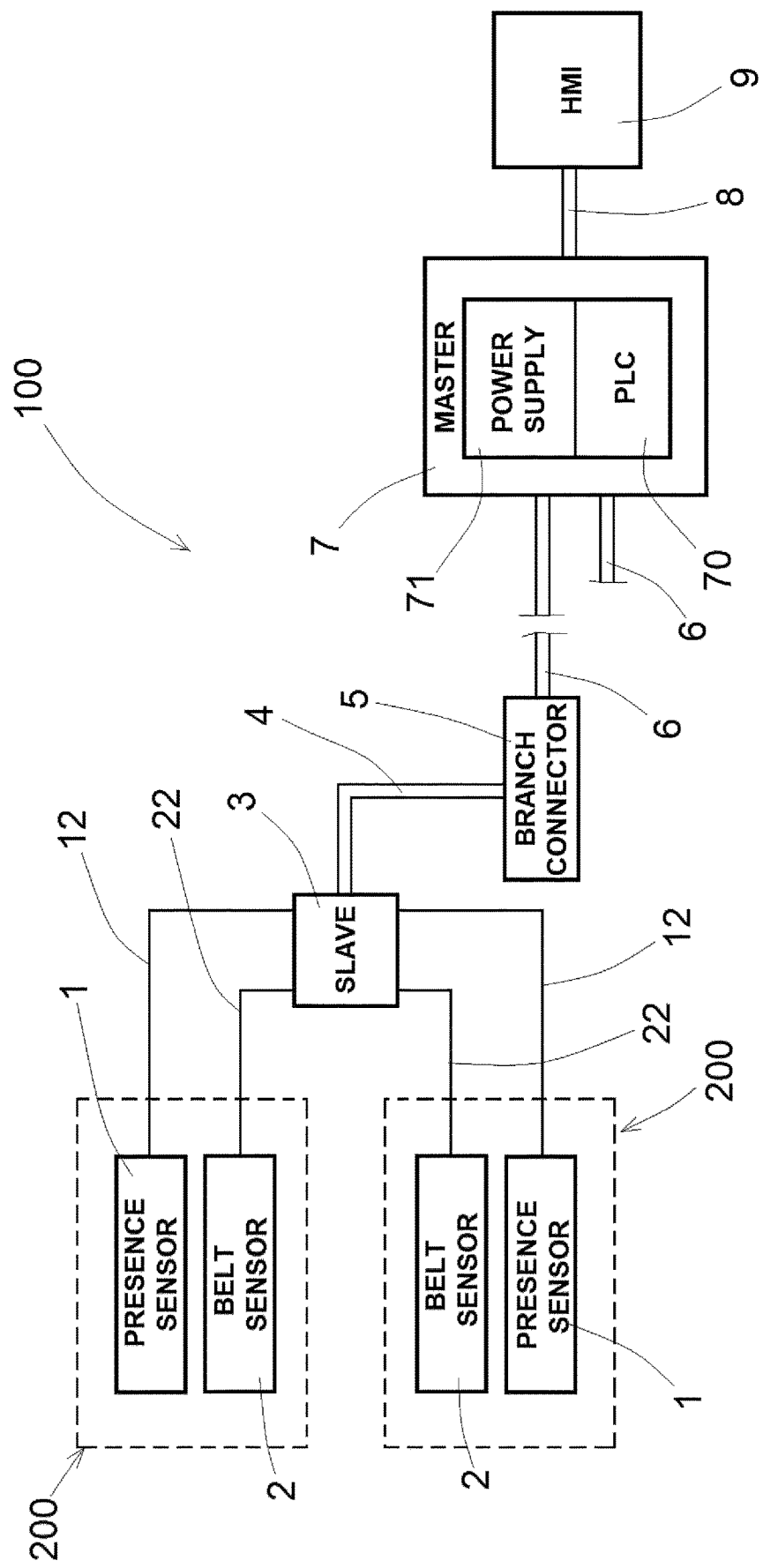
FIG. 2 is a block diagram of the monitoring system of FIG. 1.

With reference to FIGS. 1 and 2, the monitoring system (100) comprises a plurality of presence sensors (1) suitable for detecting the presence of a passenger on each passenger seat (200) and a plurality of belt sensors (2) suitable for detecting the fastening of the seat belt (202) of each passenger seat (200).

Figure 3:
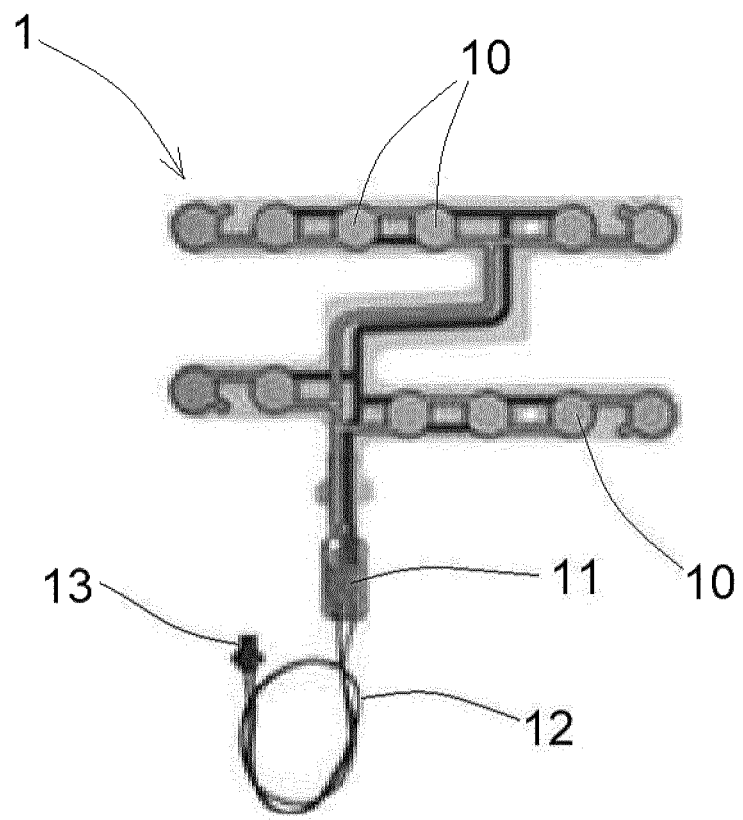
FIG. 3 is a plan view of a presence sensor of the monitoring system.

With reference to FIGS. 1A and 3, each presence sensor (1) is installed in the seat (201) of the passenger seat, for example inside or under the foam padding of the seat. The presence sensor (1) comprises a plurality of weight sensors (10), for example load cells, which are connected and disposed in such a way to occupy a large surface of the seat (201).

The weight sensors (10) are connected to an electrically controlled microswitch (11). The microswitch (11) can be normally open (NA) or normally closed (NC). The weight sensors (10) send an electric command signal to the microswitch (11) that indicates the weight.

The microswitch (11) is set in such a way to switch (change status from NA to NC or vice versa) when the electrical command signal sent by the weight sensors (10) exceeds a preset threshold value, for example a value that corresponds to a weight of 7 Kg.

In addition to being connected to the weight sensors (10), the microswitch (11) is connected to electrical cables (12) in order to power the weight sensors (10) and transmit the signal that indicates the status of the microswitch (11). The electric cables (12) are provided with an electrical connector (13).

Figure 4:
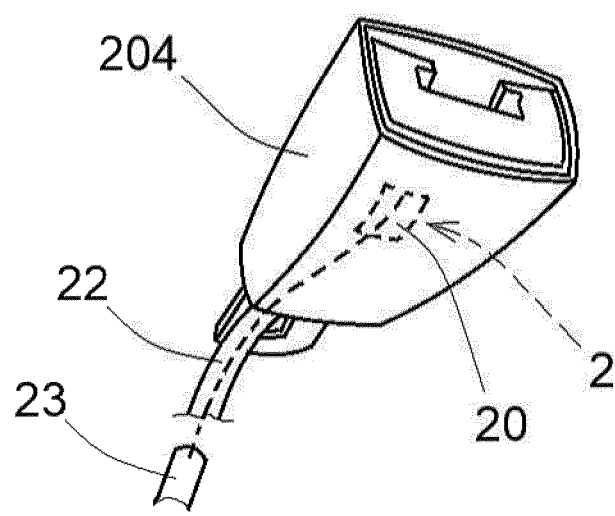
FIG. 4 is a perspective view of a belt sensor disposed in a lock of a seat belt of the monitoring system.

With reference to FIGS. 1A and 4, each belt sensor (2) is installed in the lock (204) of the seat belt in such a way to detect when the buckle (203) of the seat belt is inserted in the lock (204) of the seat belt.

The belt sensor (2) comprises a mechanically controlled microswitch (20). The microswitch (20) can be normally open (NA) or normally closed (NC).

When the buckle (203) of the seat belt enters the lock (204), the microswitch (20) is mechanically controlled and changes its status from NA to NC or vice versa.

The microswitch (20) of the belt sensor is connected to an electrical cable (22) to transmit an electrical signal that indicates the status of the microswitch (20). The electrical cable (22) of the belt sensor is provided with an electrical connector (23).

Although presence sensors and belt sensors of microswitch type are mentioned in this description, equivalent sensors, such as capacitive sensors, magnetic sensors, and the like, can be also used.

With reference to FIGS. 1, 2, 6 and 5, the monitoring system (100) comprises a plurality of slaves (3) that are connected to the presence sensors (1) and to the belt sensors (2) of the passenger seats (200).

Each slave (3) can be connected to one or more presence sensors (1) and to one or more seat sensors (2).

If two or more presence sensors (1) and two or more seat sensors are connected to a slave (3), the number of slaves (3) will be lower than the number of passenger seats (200) to be monitored.

Generally, multiple rows of passenger seats are provided in a bus, on the right and on the left of a central aisle. In such a case, a slave (3) can be provided for each row of passenger seats on the right and on the left of the aisle.

Generally, each row is composed of two adjacent passenger seats; in such a case the slave (3) can be disposed between the two adjacent passenger seats and the slave (3) is connected to the presence sensors (1) and the belt sensors (2) of the two adjacent passenger seats.

The slave (3) is a transducer that receives the signals from the presence sensors (1) and from the belt sensors (2) and interprets the status (open/closed) of the microswitches (11, 20), of the presence sensors (1) and of the belt sensors (2).

Preferably, the slave (3) is a module that works as a standard AS-i (sensor/actuator interface). The slaves (3) create a field bus that allows for considerably reducing the connections.

Figures 5, 6:
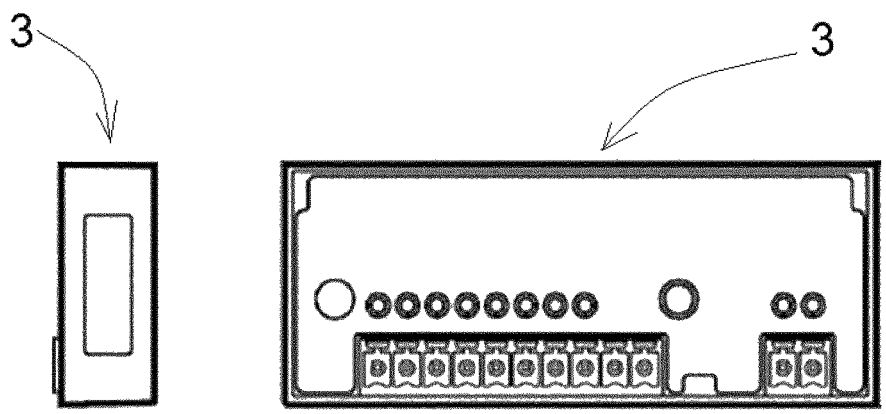
FIGS. 5 and 6 are a front view and a side view of a slave of the monitoring system, respectively.

FIGS. 5 and 6 illustrate a slave (3) with four digital inputs and four digital outputs.

The two connectors (13) of the electrical cables (12) of two presence sensors and the two connectors (23) of the electrical cables (22) of two belt sensors are connected to the four inlets of the slave.

Figure 7:
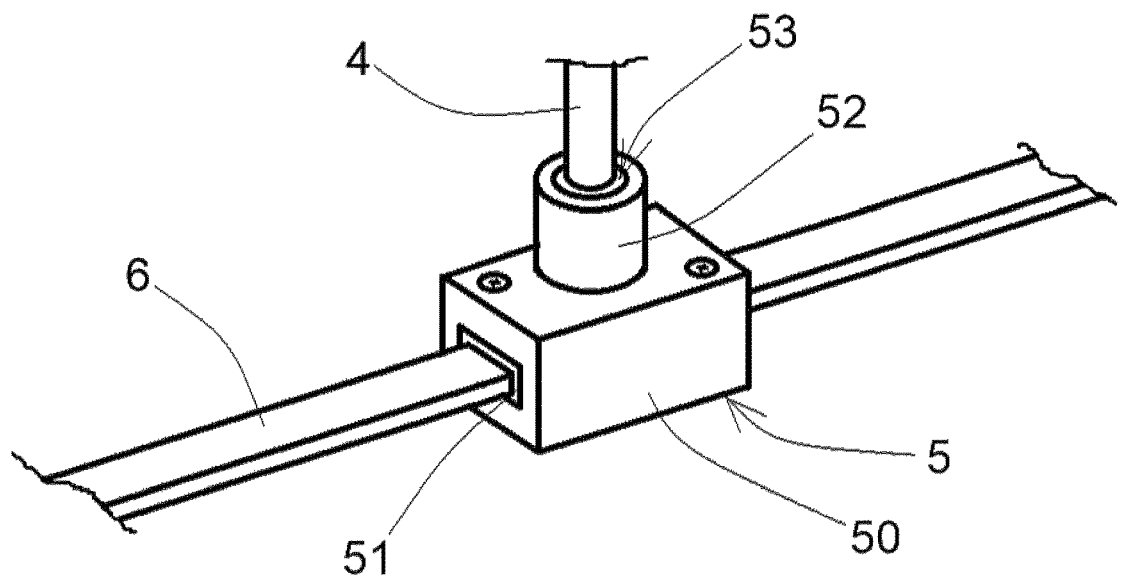
FIG. 7 is a perspective view of a branch connector of the monitoring system.

A branch cable (4) is connected to the outputs of the slave (3) by means of a connector. With reference to FIGS. 1, 2 and 7, the branch cables (4) that come out of the slaves (3) are connected to at least one connection cable (6).

The branch cable (4) is wound under the chassis of the passenger seat (200) and comes out of the chassis of the passenger seat in order to be connected to the connection cable (6).

Preferably, two connection cables (6) are provided in the two opposite lateral walls of the bus. However, a single connection cable (6) can be provided in a lateral wall of the bus. The connection cable is provided in a lateral wall of the bus, whereas the passenger seats (200) are provided and equipped with presence sensors (1) and belt sensors (2). Regardless of the number of passenger seats on each side, the connection cable (6) is always one and can receive a plurality of branch cables (4).

Figure 9:
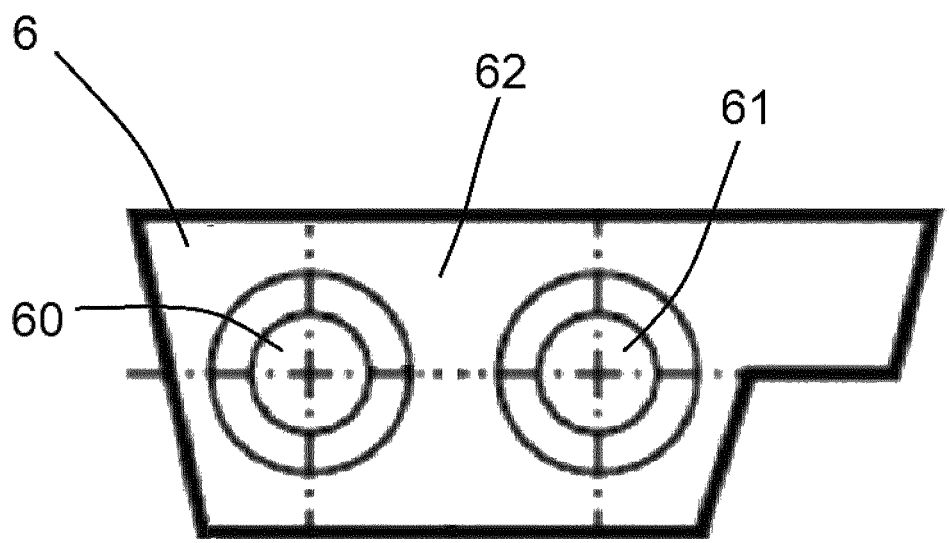
FIG. 9 is a front view of a connection cable of flat type of the monitoring system.
Figures 10, 11:
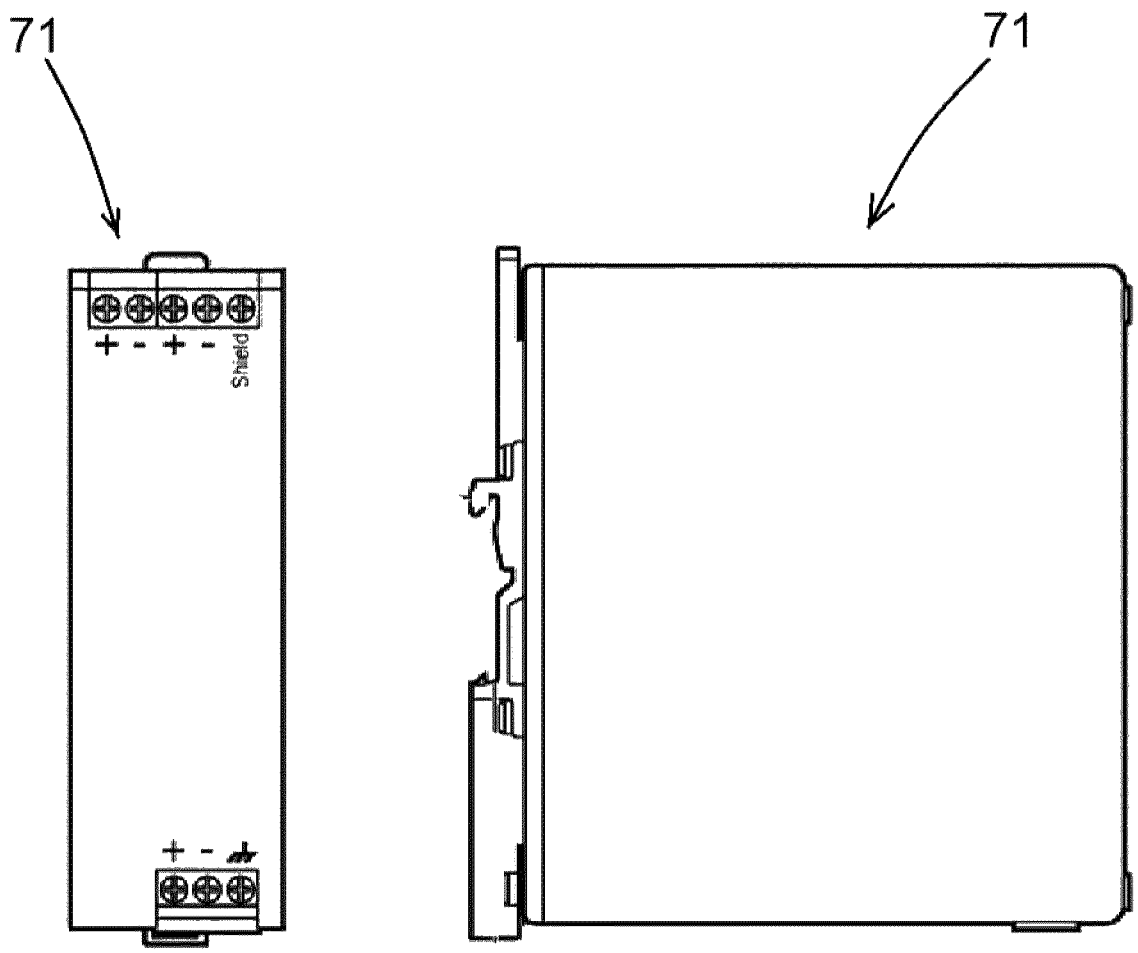
FIGS. 10 and 11 are a front view and a side view of a power supply unit of the master of the monitoring system.
Figure 12:
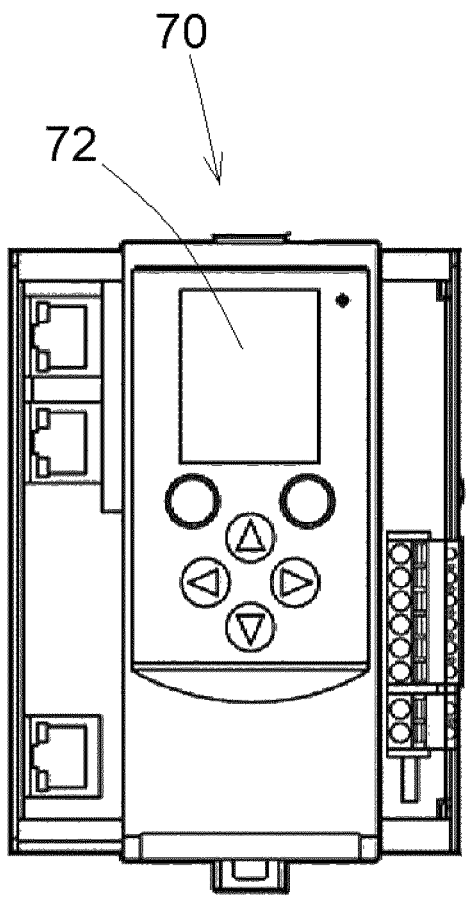
FIGS. 12 and 13 are a front view and a side view of a central processing unit (CPU) of the master of the monitoring system, respectively.
Figure 13:
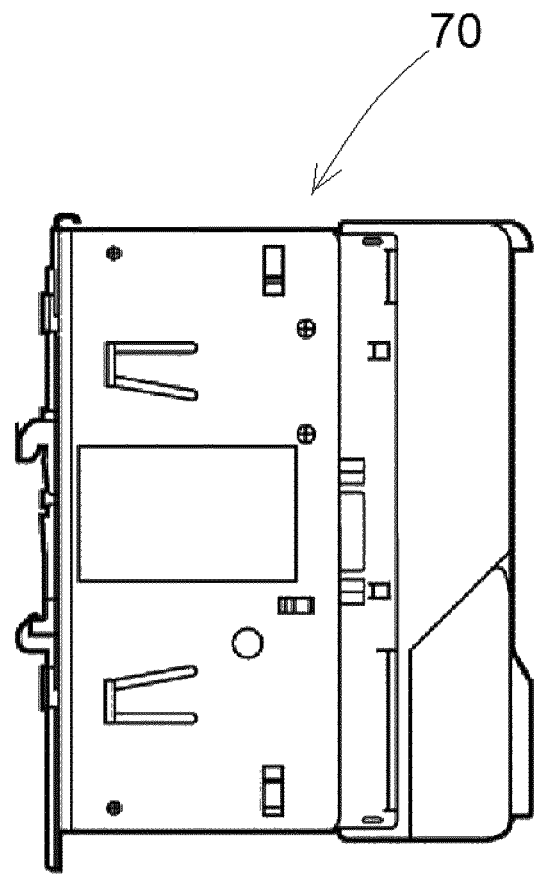

With reference to FIG. 9, the connection cable (6) is a flat cable with AS-i standard, of bipolar type, provided with a negative pole (60) and a positive pole (61) covered by an insulation sheath (62) made of thermoplastic elastomer (TPE).

Such a type of connection cable (6) has the following advantages:
  the signal transmission is reliable;
  the components can be connected rapidly by perforating the insulation sheath that surrounds the poles and is provided with a self-healing system;
  it is protected against polarity inversions because of the special shape;
  it has a high protection degree in compliance with the requirements of industrial sectors with critical conditions; and
  it has a large operating temperature range.

Figure 8:
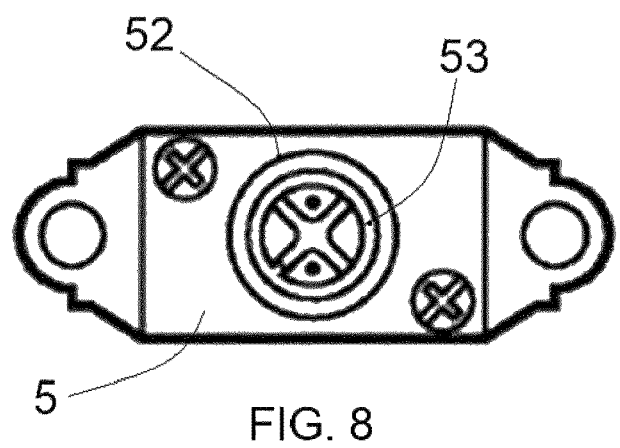
FIG. 8 is a plan view of the branch connector.

With reference to FIGS. 7 and 8, the branch cable (4) is connected to the connection cable (6) by means of a T-branch electrical connector (5) in such a way to create a branch in the connection cable (6).

The electrical connector (5) comprises a box (50) with a through channel (51) crossed by the connection cable (6) and a shank (52) that extends radially from the box.

The shank (52) has a channel (53) in radial communication with the through channel (51) to receive the branch cable (5).

With reference to FIGS. 1, 2, and 10-13, the two connection cables (6) are connected to a master (7). For illustration purposes, the master (7) can be disposed in the front of the bus, near a driver station (300) or in an area of the bus with the switchboards.

The master (7) comprises a central processing unit (CPU) (70) and a power supply (71).

The power supply (71) powers the CPU (70), the slaves (3), the presence sensors (1) and the belt sensors (2). The power supply (71) is connected to a power line provided inside each connection cable (6). Therefore, also the branch cables (4) will have a power line connected to the power line of the connection cable (6).

The master (7) works as a gateway between the signals that are transported in the connection cables (6) and the CPU (70). The CPU (70) comprises a programmable logic controller (PLC) suitable for receiving the signals from the slaves (3) that indicate the status of the switches of the presence sensors and of the belt sensors. The master (7) can manage all the slaves (3). Obviously, the master (7) must work with the same standard as the slaves, which can be for example the AS-i standard.

The master is the preferred solution because of the fast reliable data exchange with the presence sensors (1) and the belt sensors (2).

The master comprises a color display (72) to display the status of the slaves (3).

The master has a fast configuration menu with a user-friendly layout that ensures an easy configuration, setup and diagnostics.

The master (7) is connected by means of a network cable (8) to a human-machine interface (HMI) (9) disposed in the front of the bus near the driver station (300) in a clearly visible position for the driver.

Figure 14:
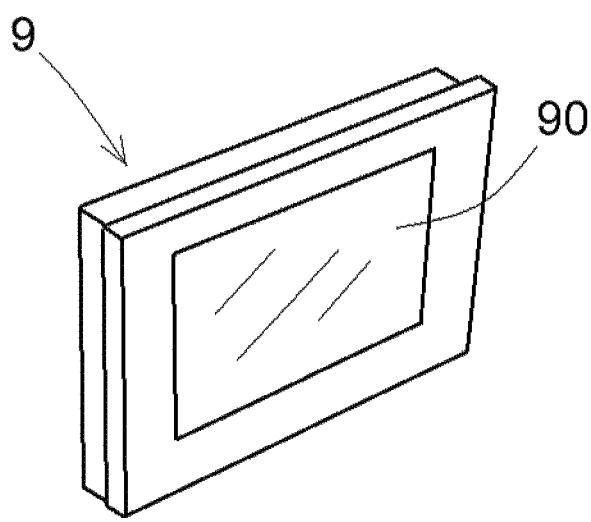
FIG. 14 is a perspective view of a human-machine interface (HMI) of the monitoring system.
Figure 15:
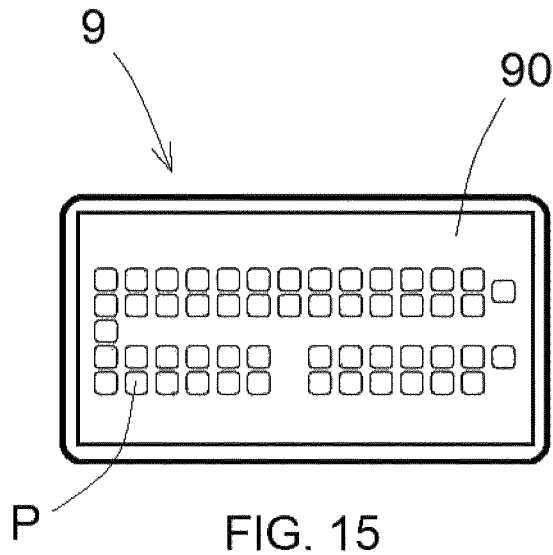
FIG. 15 is a screen view of the display of the HMI of FIG. 14.

With reference to FIGS. 14 and 15, the HMI comprises a monitor (90) that is visible to the driver.

The monitor (90) displays a graphic interface that shows all the seats of the bus and their position, for example, as squares (P). In such a way, different colors of the squares (P) can be used to indicate:
- the free seats (identified by the presence sensors (1) that are not activated);
- the seats occupied by passengers with unfastened belt (identified by the activated presence sensors (1) and by the non-activated belt sensors (2));
- the seats occupied with fastened belt (identified by the activated presence sensors (1) and by the activated belt sensors (2)).

In view of the above, before starting the bus, the driver can identify the seats occupied by passengers with unfastened seat belts and invite the passengers to fasten their seat belts.

Numerous equivalent variations and modifications can be made to the present embodiment of the invention, which are within the reach of an expert of the field and fall in any case within the scope of the invention as disclosed by the appended claims.

The invention claimed is:

1. A monitoring system for a bus, wherein the bus has a plurality of passenger seats, each of the plurality of passenger seats has a seat and a seat belt connected to a buckle received in a lock, the monitoring system comprising:
   a plurality of presence sensors adapted to detect a presence of passengers respectively in the plurality of passenger seats;
   a plurality of belt sensors adapted to detect a fastening of the respective seat belts in the plurality of passenger seats;
   a central processing unit (CPU) that receives signals from said plurality of presence sensors and the plurality of belt sensors;
   a human-machine interface (HMI) connected to said CPU so as to provide information on a status of said plurality of presence sensors of said plurality of belt sensors;
   a plurality of slaves, wherein each slave of said plurality of slaves is connected to at least one presence sensor of said plurality of presence sensors and to at least one belt sensor of said plurality of belt sensors, wherein each slave has a transducer that receives signals from the at least one presence sensor and from the at least one belt sensor so as to interpret a status of the at least one presence sensor and the at least one belt sensor;
   a plurality of branch cables connected said plurality of slaves to at least one connection cable, the at least one connection cable adapted to be disposed in a lateral wall of the bus, the at least one connection cable transmitting signals from said plurality of slaves;
   a master comprising said CPU, said master connected to the at least one connection cable so as to receive the signals from said plurality of slaves and to send the signals to said HMI by a network cable, wherein the at least one connection cable is a flat bipolar cable having a negative pole and a positive pole coated with an insulating sheath, the insulating sheath formed of a thermoplastic elastomer; and
   a plurality of T-branch electrical connectors that connect said plurality of branch cables to the at least one connection cable, wherein each belt sensor of said plurality of belt sensors is adapted to be installed in the lock of the seat belt so as to detect an insertion of the buckle in the lock, wherein each belt sensor of said plurality of belt sensors has a microswitch that is mechanically controlled by the buckle, the microswitch being normally open or normally closed, the microswitch being connected to one of the plurality of slaves by an electrical cable.

2. The monitoring system of claim 1, wherein theat least one connection cable is adapted to be disposed in a pair of opposite lateral walls of the bus.

3. The monitoring system of claim 1, wherein said plurality of slaves and the at least one connection cable and said master works according to an Actuator Sensor Interface standard.

4. The monitoring system of claim 1, wherein said master has a power supply that powers said CPU and said plurality of slaves by way of a power supply line in the at least one connection cable.

5. The monitoring system of claim 1, wherein each presence sensor of said plurality of presence sensors has a plurality of weight sensors that are mutually connected and disposed adjacent a surface of the seat, the plurality of weight sensors being connected to an electrically-operated microswitch, the electrically-operated microswitch being normally open or normally closed, the plurality of weight sensors sending an electrical command signal to the electrically-operated microswitch that is indicative of the detected weight on the surface of the seat, the electrically-operated microswitch being connected to said at least one of said plurality of slaves by the electrical cable.

* * * * *